United States Patent
Steffan et al.

(10) Patent No.: US 9,819,191 B1
(45) Date of Patent: Nov. 14, 2017

(54) MAXIMUM POWER POINT TRACKING FOR LOW POWER ENERGY HARVESTING

(71) Applicant: Infineon Technologies AG, Neubiberg (DE)

(72) Inventors: Christoph Steffan, Graz (AT); Gerald Holweg, Graz (AT)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 15/352,293

(22) Filed: Nov. 15, 2016

(51) Int. Cl.
| | |
|---|---|
| H02M 3/156 | (2006.01) |
| H02J 3/38 | (2006.01) |
| H02J 3/46 | (2006.01) |
| H02J 3/14 | (2006.01) |
| H02M 1/00 | (2006.01) |

(52) U.S. Cl.
CPC ............... *H02J 3/385* (2013.01); *H02J 3/14* (2013.01); *H02J 3/382* (2013.01); *H02J 3/46* (2013.01); *H02M 1/00* (2013.01); *H02M 2001/0009* (2013.01)

(58) Field of Classification Search
CPC ............ H02J 3/385; H02J 1/102; H02M 1/44; H02M 3/155; H02M 3/156–3/157; H02M 3/1584; H02M 3/1588; G05F 1/56; G05F 1/573; G05F 1/575; Y02B 70/1466; H03F 2200/351
USPC ................................................... 323/271–285
See application file for complete search history.

(56) References Cited

U.S. PATENT DOCUMENTS

| | | | | |
|---|---|---|---|---|
| 2004/0004798 A1* | 1/2004 | Priest | ................. | H02H 9/004 361/93.1 |
| 2004/0090726 A1* | 5/2004 | Ball | .................. | H02H 9/001 361/93.9 |

OTHER PUBLICATIONS

"Ultra Low Power Harvester Power Management IC with Boost Charger, and Autonomous Power Multiplexor," Texas Instruments, retrieved on May 31, 2016, from http://www.ti.com/product/BQ25505, 3 pp.
"LTC3106—300mA Low Voltage Buck-Boost Converter with PowerPath and 1.6μA Quiescent Current," Linear Technology, retrieved on May 31, 2016, http://www.linear.com/product/LTC3106 from 2 pp.
"EM8500" EM Microelectronic, retrieved on May 31, 2016 from http://www.emmicroelectronic.com/products/power-management/pmu-dc-energy-harvesting-controller/em8500, 1 pp.

* cited by examiner

*Primary Examiner* — Yemane Mehari
(74) *Attorney, Agent, or Firm* — Shumaker & Sieffert, P.A.

(57) ABSTRACT

A controller for controlling a power converter is described. The controller may include a current sensor and a pulse modulation device. The current sensor may receive a first amount of current from the power converter. In response to receiving the first amount of current, the pulse modulation device may output a pulse modulated signal defined by a first frequency. After outputting the pulse modulated signal defined by the first frequency, the pulse modulation device may adjust the pulse modulated signal from the first frequency to a second frequency. The current sensor may receive a second amount of current from the power converter. The pulse modulation device may also re-adjust the pulse modulated signal from the second frequency to a third frequency; and output the pulse modulated signal defined by the third frequency.

20 Claims, 5 Drawing Sheets

US 9,819,191 B1

MAXIMUM POWER POINT TRACKING FOR LOW POWER ENERGY HARVESTING

TECHNICAL FIELD

The disclosure relates to energy harvesting, and in particular, to techniques and circuits associated with energy harvesting.

BACKGROUND

Regenerative power sources, such as photovoltaic sources, thermal sources, wind powered sources, or piezoelectric structures, generate power from renewable resources (e.g., the sun, wind, etc.). A power converter may be coupled to a regenerative power source in order to convert the power generated by the regenerative power source to a different power level that can be used by a load. A controller may be coupled to the regenerative power source and the power converter to maximize the amount of power generated by the power source. For example, the controller may use maximum power point tracking (MPPT) techniques to maximize the energy harvested from the regenerative power source.

SUMMARY

In general, the techniques described in this disclosure are related to harvesting energy. A power converter may receive power from a power source and convert the power to a level usable by a load. The power converter may be coupled to a controller that controls the power converter. The controller may detect a change in the amount of current provided by the power converter and adjust a pulse modulated signal used to control the power converter based at least in part on the change in the amount of current.

In one example, the disclosure describes a controller for controlling a power converter. The controller may include a pulse modulation device and a current sensor. The controller may be configured to receive, by the current sensor, a first amount of current from the power converter. In response to receiving the first amount of current, the controller may be configured to output a pulse modulated signal defined by a first frequency. The controller may also be configured to, after outputting the pulse modulated signal defined by the first frequency, adjust, by the pulse modulation device, the pulse modulated signal from the first frequency to a second frequency. The controller may be configured to, in response to adjusting the pulse modulated signal, receive, by the current sensor, a second amount of current from the power converter. The controller may also be configured to re-adjust, by the pulse modulation device and based at least in part on a change from the first frequency to the second frequency, the first amount of current, and the second amount of current, the pulse modulated signal from the second frequency to a third frequency. The controller may be further configured to output, by the pulse modulation device and to the power converter, the pulse modulated signal defined by the third frequency.

In another example, the disclosure describes a method for controlling a power converter. The method may include receiving, by a current sensor of the controller, a first amount of current from the power converter. The method may include, in response to receiving the first amount of current, outputting, by a pulse modulation device of a controller and to the power converter, a pulse modulated signal defined by a first frequency. The method may also include, after outputting the pulse modulated signal defined by the first frequency, adjusting, by the pulse modulation device, the pulse modulated signal from the first frequency to a second frequency. The method may include, in response to adjusting the pulse modulated signal, receiving, by the current sensor, a second amount of current from the power converter. The method may also include re-adjusting, by the pulse modulation device, and based at least in part on a change from the first frequency to the second frequency, the first amount of current, and the second amount of current, the pulse modulated signal from the second frequency to a third frequency. The method may further include outputting, by the pulse modulation device and to the power converter, the pulse modulated signal defined by the third frequency.

In another example, the disclosure describes a system that includes a power converter and a controller. The controller may include a pulse modulation device and a current sensor. The current sensor may be configured to receive a first amount of current from the power converter. The pulse modulation device may be configured to, in response to receiving the first amount of current, output, to the power converter, a pulse modulated signal defined by a first frequency. The pulse modulation device may be configured to, after outputting the pulse modulated signal defined by the first frequency, adjust the pulse modulated signal from the first frequency to a second frequency. The current sensor may be configured to, in response to adjusting the frequency of the pulse modulated signal, receive a second amount of current from the power converter. The pulse modulation device may also be configured to re-adjust, based at least in part on a change from the first frequency to the second frequency, the first amount of current, and the second amount of current, the pulse modulated signal from the second frequency to a third frequency. The pulse modulation device may be further configured to output, to the power converter, the pulse modulated signal defined by the third frequency The details of one or more examples are set forth in the accompanying drawings and the description below. Other features, objects, and advantages of the disclosure will be apparent from the description and drawings, and from the claims.

DETAILED DESCRIPTION

Figure 1:
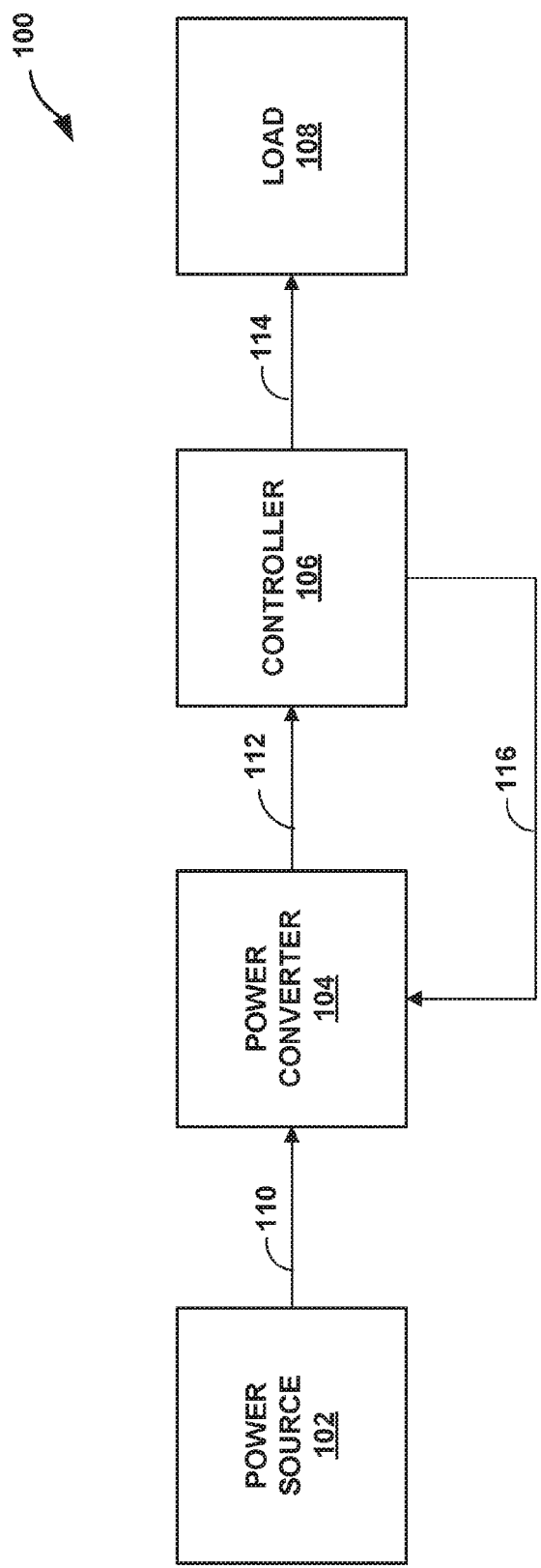
FIG. 1 is a block diagram illustrating an example system for harvesting power from a power source, in accordance with one or more aspects of this disclosure.

In general, this disclosure is directed to systems and methods of harvesting energy. Some regenerative power sources generate energy from renewable resources. Examples of regenerative power sources include photovoltaic cells (also referred to as solar cells), wind turbines, thermoelectric generators, etc. The amount of power generated by a regenerative power source may depend upon the environmental conditions, such as time of day, weather, temperature, etc. For instance, a solar cell may generate a particular voltage at full sunlight at a particular temperature, but may generate less voltage if the temperature increases. In order to maximize the amount of power generated by a regenerative power source, the power source may be coupled to a power converter and a controller. The controller may output a signal to the power converter which may cause the power converter to operate at the level that maximizes the amount of power generated by the power source.

In some examples, the controller may utilize Maximum Power Point Tracking (MPPT) techniques in order to maximize the amount of power generated by the power source. In contrast to some MPPT techniques that maximize the power output by the power source, techniques of this disclosure may enable a controller to track the amount of power output by the power converter by outputting a pulse modulated signal to the power converter, evaluating the current output by the power converter, and adjusting the pulse modulated signal to increase the amount of current, and hence power, output by the power converter. For example, a controller may control the power converter using a pulse modulated signal defined by a first frequency and may receive a first current from the power converter. The controller may adjust the pulse modulated signal to a second frequency and may receive a second current from the power converter. The controller may re-adjust the pulse modulated signal based on the change in the frequency and the change in the current. In other words, the controller may re-adjust the pulse modulated signal by determining whether the current increased or decreased when the frequency of the pulse modulated signal changed. By re-adjusting the pulse modulated signal, the controller may cause the power converter to output a current approaching the maximum current, and hence the maximum power.

In contrast to some techniques that maximize the power output by the power source, in some examples, techniques of this disclose may enable to controller to track the maximum current, and hence the power, output by the power converter. By maximizing the power output by the power converter rather than the power output by the power source, the techniques of this disclosure may enable an energy harvesting system to account for the efficiency of the power converter, which is not accounted for in some techniques and which may contribute to the overall efficiency of the energy harvesting system.

In some examples, in contrast to some techniques (e.g., so called "fractional open-circuit" (FOC) MPPT techniques) in which the controller disconnects the power converter from the power source to measure the characteristics of the power source (e.g., an open-circuit voltage of the unloaded power source), the techniques of this disclosure may enable the controller to maximize the current and power output by the power converter without disconnecting the power source from the power converter. Thus, in some examples, the controller may maximize the power output by the power converter without interrupting power flow to the power converter and/or the load.

Further, in contrast to some techniques that utilize high precision sensors to measure the current and/or voltage of the power source with high accuracy, techniques of this disclosure may enable a controller to maximize the power generated by a power converter by determining a direction of change in the current without necessarily determining the precise magnitude of the current. As a result, in some examples, the controller may utilize a less precise current sensor, which may reduce the cost and complexity of the current sensor. Further, by maximizing the current and power output by the power converter rather than maximizing the power output by the power source, techniques of this disclosure may enable a controller to control a power converter regardless of the characteristics of the power source, which may provide a universal design.

FIG. 1 is a block diagram illustrating a system 100 for harvesting power from power source 102, in accordance with one or more aspects of this disclosure. FIG. 1 shows system 100 as having four separate and distinct components shown as power source 102, power converter 104, controller 106, and load 108, however system 100 may include additional or fewer components. For instance, power source 102, power converter 104, controller 106, and load 108 may be four individual components or may represent a combination of one or more components that provide the functionality of system 100 as described herein.

System 100 may include links 110, 112, 114, and 116. Links 110, 112, 114, and 116 represent any medium capable of conducting electrical power from one location to another. Examples of links 110, 112, 114, and 116 include, but are not limited to, physical and/or wireless electrical transmission mediums such as electrical wires, electrical traces, conductive gas tubes, twisted wire pairs, and the like.

System 100 may include power source 102 which provides electrical power to load 108. In some examples, power source 102 may include one or more regenerative power sources, such as photovoltaic sources (e.g., solar panels), thermo-electric generators, piezoelectric structures, or other regenerative power source that may generate power from a renewable resource. In other examples, power source 102 may include power grids, generators (e.g., thermal powered, hydro-powered, or wind-powered), transformers, batteries, or any other form of devices that are capable of providing electrical power to system 100. In some examples, where power source 102 includes a regenerative power source, the amount of energy harvested from the renewable resource may be very volatile and may fluctuate over several orders of magnitude depending upon the environmental conditions. For example, the amount of power generated by power source 102 may range from very low power (e.g., microwatts) to relatively high power (e.g., watts).

System 100 may include load 108 which may receive the electrical power (e.g., voltage, current, etc.) converted by power converter 104. Numerous examples of load 108 exist and may include batteries, microprocessors, electrical components, circuits, computing devices and related components (e.g., laptop computers, desktop computers, tablet computers, mobile phones, etc.), speakers, lighting units, automotive/marine/aerospace/train related components, motors, transformers, or any other type of electrical device and/or circuitry that receives a voltage or a current from a power converter.

System 100 includes power converter 104 which operates as a switch-based power converter that converts one form of electrical power provided by power source 102 into a different, and usable form, of electrical power for powering load 108. In some examples, such as where power source 102 that outputs DC power, power converter 104 may include DC-to-DC power converter, which may also be called a charge pump. In other examples, power converter may include AC-to-DC converter or a DC-to-AC converter. Power converter 104 may include one or more switches (e.g., MOS transistor based switches, gallium nitride (GaN) based switches, thyristors, insulated-gate bipolar transistors (IGBTs), or the like) arranged in a power stage configuration (e.g., a single phase, or multi-phase half-bridge configuration, etc.) to change the current or voltage level output by power converter 104.

In some examples, power converter 104 may include a step-up converter that outputs power with a higher voltage level than the voltage level of input power received by the step-up converter. One example of such step-up converter may be referred to as a boost converter. In some examples, power converter 104 may include a step-down converter configured to output power with a lower voltage level than the voltage level of input power received by the step-down converter. One example of such a step-down converter may be referred to as a buck converter. In still other examples, power converter 104 may be a step-up and step-down converter (e.g., a buck-boost converter) that is capable of outputting power with a voltage level that is higher or lower level than the voltage level of the power input received by the step-up and step-down converter.

Controller 106 may control operation of power converter 104. In some examples, controller 106 may output a pulse modulated signal via link 116 in order to control the one or more switches of power converter 104. For example, controller 106 may output a pulse modulated signal to control (e.g., turn-on and turn-off) the one or more switches using modulation techniques, such as pulse density modulation (PDM), pulse width modulation (PWM), pulse frequency modulation (PFM), or another suitable modulation technique. In PWM, the width (i.e., duration) of the pulse is modulated based on a modulator signal. In PDM, the relative density of a pulse corresponds to an analog signal's amplitude. In PFM, the frequency of a pulse train is varied based on the instantaneous amplitude of the modulating signal at sampling intervals. By controlling the switches of power converter 104 using modulation techniques, controller 106 may regulate the current or voltage level of the power output by power converter 104. Examples of controller 106 may include, but are not limited to, one or more processors, including, one or more microprocessors, digital signal processors (DSPs), application specific integrated circuits (ASICs), field programmable gate arrays (FPGAs), or any other equivalent integrated or discrete logic circuitry, as well as any combinations of such components.

In accordance with techniques of this disclosure controller 106 may track a maximum power point of the power generated by power converter 104 by detecting a change in the current output by power converter 104 and by varying a pulse modulated signal based on the change in the current. In contrast to some MPPT techniques where a controller disconnects a power source from a power converter (e.g., by opening a switch between the power source and the power converter) to measure the open-circuit voltage of the unloaded power source, in some examples, controller 106 may vary a pulse modulated signal to power converter 104 and determine the direction of the change in a current output by the power converter as the pulse modulated signal changes. By detecting the change in the current caused by varying the pulse modulated signal, controller 106 may maximize the current, and hence the power, output by power converter 104 without disconnecting power converter 104 from power source 102.

In some examples, power converter 104 may receive an input power from power source 102 and may output a first amount of current. Controller 106 may receive the first amount of current and may store an indication of the first amount of current (e.g., via a sample-and-hold circuit). In some examples, controller 106 may sample the output of power converter 104 without disconnecting power converter 104 from power source 102.

In response to receiving the first amount of current, controller 106 may output a pulse modulated signal defined by a first frequency. For instance, as will be described in more detail in later figures, controller 106 may include an integrator that may compare an indication of the first amount of current to an indication of a previous amount of current, and output a voltage based on the comparison. In some examples, the first frequency of the pulse modulated signal may be based on the voltage output by the integrator.

In some examples, after outputting the pulse modulated signal defined by the first frequency, controller 8 may adjust the pulse modulated signal from the first frequency to a second frequency. In some instances, controller 106 may adjust the frequency by a predetermined amount (e.g., by a predetermined percentage of the current frequency or by a predetermined frequency). In other examples, controller 106 may determine by how much to adjust the frequency and may adjust the frequency by the determined amount. Controller 106 may output, to one or more switches of power converter 104, the pulse modulated signal defined by the second frequency. Power converter 104 may receive the pulse modulated signal defined by the second frequency. Based on the pulse modulated signal defined by the second frequency, power converter 104 may turn-on or turn-off the switches of power converter 104 at a different rate (e.g., faster or slower), which may cause power converter 104 to output a second amount of current associated with the second output power level.

Controller 106 may receive the second amount of current from power converter 104 and may re-adjust the pulse modulated signal. In some examples, controller 106 may re-adjust the pulse modulated signal based on the first amount of current, the second amount current, and a change from the first frequency to the second frequency. For example, controller 106 may determine whether the amount of current received from power converter 104 increased or decreased as a result of adjusting the pulse modulated signal, and may re-adjust the pulse modulated signal based on the determination.

In some examples, controller 106 may re-adjust the pulse modulated signal by increasing the frequency of the pulse modulated signal such that the third frequency is greater than the second frequency. For instance, if controller 106 adjusted the pulse modulated signal by increasing the frequency of the pulse modulated signal, and the current increased as a result, controller 106 may re-adjust the pulse modulated signal by increasing the frequency of the pulse modulated signal. In other words, if the second frequency is greater than the first frequency and the second amount of current is greater than the first amount of current, controller 106 may increase the frequency of the pulse modulated signal such that a third frequency of the pulse modulated signal is greater than the second frequency of the pulse modulated signal. Similarly, in some instances, if controller 106 adjusted the pulse modulated signal by decreasing the frequency of the pulse modulated signal, and the current decreased as a result, controller 106 may re-adjust the pulse modulated signal by increasing the frequency of the pulse modulated signal. In other words, if the second frequency is less than the first frequency and the second amount of current is less than the first amount of current, controller 106 may increase the frequency of the pulse modulated signal such that a third frequency of the pulse modulated signal is greater than the second frequency of the pulse modulated signal.

In some examples, controller 106 may re-adjust the pulse modulated signal by decreasing the frequency such that the third frequency of the pulse modulated signal is smaller than the second frequency. For instance, if controller 106 adjusted the pulse modulated signal by increasing the frequency of the pulse modulated signal, and the current decreased as a result, controller 106 may re-adjust the pulse modulated signal by decreasing the frequency of the pulse modulated signal. In other words, if the second frequency is greater than the first frequency and the second amount of current is less than the first amount of current, controller 106 may decrease the frequency of the pulse modulated signal such that a third frequency of the pulse modulated signal is less than the second frequency of the pulse modulated signal. Similarly, in some instances, if controller 106 adjusted the pulse modulated signal by decreasing the frequency of the pulse modulated signal, and the current increased as a result, controller 106 may re-adjust the pulse modulated signal by decreasing the frequency of the pulse modulated signal. In other words, if the second frequency is less than the first frequency and the second amount of current is greater than the first amount of current, controller 106 may decrease the frequency of the pulse modulated signal such that a third frequency of the pulse modulated signal is less than the second frequency of the pulse modulated signal.

In response to re-adjusting the pulse modulated signal, controller 106 may output the pulse modulated signal defined by the third frequency to the one or more switches of power converter 104. Controller 106 may continue to make adjustments to the pulse modulated signal. For example, after outputting the pulse modulated signal defined by the third frequency, controller 106 may again adjust the pulse modulated signal, this time from the third frequency to a fourth frequency. In some examples, when switching from an odd-numbered frequency (e.g., $1^{st}$, $3^{rd}$, $5^{th}$, etc.) to an even-numbered frequency (e.g., $2^{nd}$, $4^{th}$, $6^{th}$, etc.), controller 8 may adjust the frequency by a pre-determined amount.

In some examples, when switching from an even-numbered frequency to an odd-numbered frequency, controller 106 may adjust the frequency of the pulse modulated signal based the two recent pulse modulated signals and the two recent amounts of current received by controller 106. For instance, controller 106 may receive a third amount of current, and may determine whether the third amount of current is greater than or less than the second amount of current. If the current increased (e.g., the third amount of current is greater than the second amount of current) after adjusting the frequency of the pulse modulated signal (e.g., from a third frequency to a fourth frequency), controller 106 may re-adjust the pulse modulated signal (e.g., from the fourth frequency to a fifth frequency) by changing the frequency in the same direction as the most recent change in the frequency. In other words, if the current increased as a result of increasing the frequency of the pulse modulated signal (e.g., from an odd numbered (e.g., $3^{rd}$) frequency to an even numbered frequency (e.g., $4^{th}$, etc.), controller 106 may increase the frequency again so that the pulse modulated signal is defined by an odd numbered (e.g., $5^{th}$) frequency that is greater than the even numbered (e.g., $4^{th}$) frequency. Likewise, if the current increased as a result of decreasing the frequency of the pulse modulated signal, controller 106 may decrease the frequency again. On the other hand, if the current decreased as a result of adjusting the pulse modulated signal (e.g., the third current is less than the second current), controller 106 may re-adjust the frequency of the pulse modulated signal in the opposite direction. In other words, if the current decreased as a result of increasing the frequency from an odd numbered (e.g., $3^{rd}$) frequency to an even numbered (e.g., $4^{th}$) frequency, controller 106 may decrease the frequency such that the pulse modulated signal is defined by an odd numbered (e.g., $5^{th}$) frequency that is less than the previous even numbered (e.g., $4^{th}$) frequency. Likewise, if the current decreases as a result of decreasing the frequency from the $3^{rd}$ to $4^{th}$ frequency, controller 106 may re-adjust the frequency by increase the frequency to a $5^{th}$ frequency.

In this manner, the controller may detect a change in a current output by a power converter and may adjust the pulse modulated signal based at least in part on the change in the current. By adjusting the pulse modulated signal, the controller may cause power converter 104 to output a different amount of current. By determining whether the current increased or decreased and whether the frequency of the pulse modulated signal increased or decreased, the controller may re-adjust the pulse modulated signal. By re-adjusting the pulse modulated signal, the controller may cause the power converter to output an amount of current at or near the maximum amount of current, such that the power output by the power converter is at or near the maximum power. Techniques of this disclosure may enable the controller to maximize the power generated by the power converter by determining whether the current increased or decreased without precisely measuring the amount of current, which may enable the controller to utilize less precise components and less chip space, which may reduce the energy used by the controller and the cost to manufacture the controller. Further, in contrast to some methods which disconnect the power converter from the power source (e.g., to measure the open-circuit voltage of the power source), techniques of this disclosure may enable the controller to maximize the power output by the power converter without interrupting the flow of power from the power source to the power converter and the load. Further, controller 106 may control operation of power converter 104 regardless of the characteristics of the power source, which may enable the same controller to be utilized with any power source.

Figure 2:
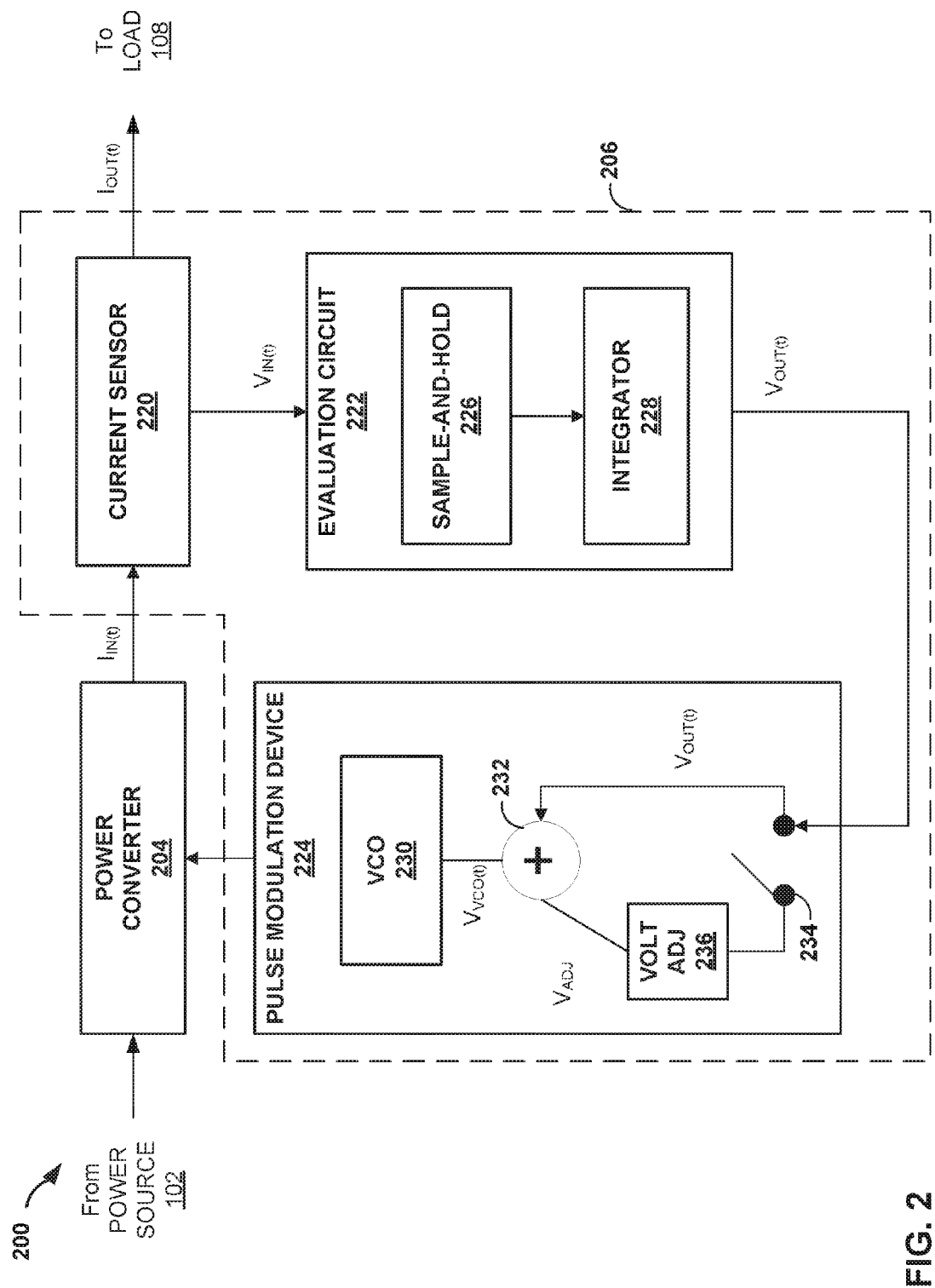
FIG. 2 is a block diagram illustrating additional details of an example controller for controlling a power converter, in accordance with one or more aspects of this disclosure.

FIG. 2 is a block diagram illustrating additional details of an example controller 206 for controlling a power converter 204, in accordance with one or more aspects of this disclosure. System 200 may include power converter 204 and controller 206, which may be examples of power converter 104 and controller 106 of FIG. 1, respectively. FIG. 2 illustrates only one particular example of power converter 204 and controller 206. Many other examples of a power converter and controller may be used and may include fewer or additional components. As illustrated in FIG. 2, controller 206 includes current sensor 220, evaluation circuit 222, and pulse modulation device 224. In some examples, controller 206 may include additional or fewer components.

In some examples, pulse modulation device 224 may include a voltage controlled oscillator (VCO) 230 which may output a pulse modulated signal defined by a particular frequency to power converter 204. Power converter 204 may receive the pulse modulated signal and a power from power source 102 and may output a current $I_{IN(t)}$ based on the pulse modulated signal and the power received from power source 202. Current sensor 220 may receive the current $I_{IN(t)}$ from power converter 204 and may output a voltage $V_{IN(t)}$ indicative of the input current $I_{IN(t)}$ to evaluation circuit 222. In other words, voltage $V_{IN(t)}$ may be based on $I_{IN(t)}$ because $V_{IN(t)}$ may be a function of current $I_{IN(t)}$ (where the subscript "(t)" indicates a time period during which the current or voltage was generated).

Evaluation circuit 222 may include a sample-and-hold circuit 226 and integrator 228. In some examples, sample-and-hold circuit 226 may receive, from current sensor 220, an input voltage $V_{IN(t)}$ indicative of the current output by power converter 204. Sample-and-hold circuit 226 may sample the input voltage $V_{IN(t)}$ and may hold the sampled input voltage $V_{IN(t)}$. Integrator 228 may receive a plurality of voltages and may output a voltage based on the received voltages. For example, integrator 228 may receive an initial voltage held by the sample-and-hold circuit 226 and a subsequent voltage from current sensor 220. Integrator 228 may compare the initial voltage from sample-and-hold circuit 226 to the subsequent voltage from current sensor 220, and may adjust a voltage $V_{OUT}$ to a higher or lower voltage, compared to its initial output voltage.

Pulse modulation device 224 may receive the voltage $V_{OUT}$ output by evaluation circuit 222 and may adjust the pulse modulated signal. In some examples, pulse modulation device 224 may adjust the pulse modulated signal by opening or closing switch 234. In some examples, pulse modulation device 224 may leave switch 234 in its current state (e.g., open or closed) and may re-adjust the pulse modulated signal based at least in part on the voltage $V_{OUT(t)}$ output by integrator 228 of evaluation circuit 222 (which, as described above, may itself be based on the initial voltage held by sample-and-hold circuit 226 and the subsequent voltage received from current sensor 220). As will be described in more detail below, in some examples, pulse modulated device 224 may adjust the pulse modulated signal based at least in part on the voltage $V_{OUT}$ output by integrator 228 and based on a previous adjustment to the pulse modulated signal.

In operation, at the beginning of a first time T1 period, power converter 204 may receive power from power source 202 and may output a first amount of current $I_{IN(1)}$ based on the power received from power source 102. Current sensor 220 may receive the first amount of current $I_{IN(1)}$. Current sensor 220 may output a first voltage $V_{IN(1)}$ indicative of the first amount of current $I_{IN(1)}$ and may output current $I_{OUT(t)}$ to load 108. Sample-and-hold circuit 226 may receive the first voltage $V_{IN(1)}$ and may hold the first voltage $V_{IN(1)}$ for a period of time. Integrator 228 may receive the first voltage $V_{IN(1)}$ and may output a voltage $V_{OUT(1)}$ that is based at least in part on the first input voltage $V_{IN(1)}$. During the first time period T1, switch 234 may be open. Thus, VCO 230 may receive output voltage $V_{OUT(1)}$ (e.g., via voltage adder 232) and may output, based at least in part on the first output voltage $V_{OUT(1)}$, a pulse modulated signal defined by a first frequency.

At the beginning of a second time period T2 that is later than the first time period T1, pulse modulation device 224 may adjust the pulse modulated signal by changing the frequency from a first frequency to a second frequency. For example, controller 206 may close switch 234 at the beginning of the second time period T2, which may cause the first output voltage $V_{OUT(t)}$ to be applied to voltage adjustment circuit 236. In some examples, voltage adjustment circuit 236 may include a voltage divider. For example, if switch 234 is closed, voltage adjustment circuit 236 may receive $V_{OUT(t)}$ from integrator 228 of evaluation circuit 222 and may output a fraction (e.g., ⅕, ⅒, or any other fraction) of the voltage $V_{OUT(t)}$ received from integrator 228 as an adjustment voltage $V_{ADJ}$. Voltage adder 232 may receive an adjustment voltage $V_{ADJ}$ from voltage adjustment circuit 236 and $V_{OUT(1)}$ from integrator 228. Voltage adder 232 may add the input voltages $V_{OUT(1)}$ and $V_{ADJ}$ and may output the combined voltage $V_{VCO(2)}$ to VCO 230. Thus, at the beginning of the second time period T2, VCO 230 may receive the combined voltage $V_{VCO(2)}$ from voltage adder 232 and may adjust the frequency of the pulse modulated signal based on the combined voltage $V_{VCO(2)}$. In other words, because switch 234 closed at the beginning of the second time period T2, the voltage received by VCO 230 may increase after closing switch 234, which may cause the frequency of the pulse modulated signal to increase from the first frequency to a second, higher frequency.

Power converter 204 may receive power from power source 202 and the pulse modulated signal defined by the second frequency. In response to receiving the pulse modulated signal defined by the second frequency, power converter 204 may output a second amount of current $I_{IN(2)}$. In some examples, the second amount of current output by power converter 204 may be based upon the power received from power source 102 and the pulse modulated signal defined by the second frequency. In other words, the pulse modulated signal defined by the second frequency may cause power converter 204 to change the amount of current output by power converter 204. Current sensor 220 may receive the second amount of current $I_{IN(2)}$ and may output a second voltage $V_{IN(2)}$ indicative of the second amount of current $I_{IN(2)}$. Sample-and-hold circuit 226 may receive the second voltage $V_{IN(2)}$ and may hold the voltage as a held voltage $V_{IN(2)}$ for a period of time.

During the second time period T2, integrator 228 may receive the second voltage $V_{IN(2)}$ from current sensor 220 and the first held voltage $V_{IN(1)}$ from sample-and-hold circuit 226. Integrator 228 may compare the second voltage $V_{IN(2)}$ indicative of the second amount of current and the first held voltage $V_{IN(1)}$ indicative of the first amount of current, and adjust the output voltage to a higher or lower voltage $V_{OUT(2)}$ based on the second voltage $V_{IN(1)}$ and the first held voltage $V_{IN(1)}$. In some examples, $I_{IN(t)}$ and $V_{IN(t)}$ may be negatively, or inversely, related. In other words, an increase in $I_{IN(T)}$ causes a decrease in $V_{IN(T)}$, and vice versa. In some examples, $I_{IN(t)}$ and $V_{IN(t)}$ may be positively related. In other words, if the second amount of current $I_{IN(2)}$ is greater than the first amount of current $I_{IN(1)}$, $V_{IN(2)}$ may be greater than $V_{IN(1)}$.

In some examples, integrator 228 may integrate the difference between two voltages by a positive value. For example, integrator 228 may integrate the difference between the two voltages by a positive integer when switch 234 is closed and $V_{IN(t)}$ and $I_{IN(t)}$ are positively related. In these examples, when $V_{IN(2)}$ is greater than $V_{IN(1)}$ and switch 234 is closed, integrator 228 may increase $V_{OUT(2)}$. Similarly, in examples where $V_{IN(2)}$ is less than $V_{IN(1)}$ and switch 234 is closed, integrator 228 may decrease $V_{OUT(2)}$.

During the second time period T2 (e.g., while switch 234 is still closed), pulse modulation device 224 may re-adjust the pulse modulated signal by changing the frequency from the second frequency to a third frequency. For example, because switch 234 may still be closed, voltage adjustment circuit 236 may receive $V_{OUT(2)}$ and may output an adjustment voltage $V_{ADJ}$. Voltage adder 232 may combine adjustment voltage $V_{ADJ}$ and $V_{OUT(2)}$ to generate voltage $V_{VCO(2')}$, and may output the combined voltage $V_{VCO(2')}$. Thus, during the second time period, VCO 230 may receive $V_{VCO(2')}$ and may adjust the pulse modulated signal by changing the frequency from the second frequency to a third frequency. For example, if switch 234 is closed such that the second frequency is greater than the first frequency, and the second current is greater than the first current, $V_{OUT(2)}$ may increase. Because $V_{OUT(2)}$ increases, $V_{VCO(2')}$ increases and the third frequency of the pulse modulated signal output by pulse modulation device 224 is greater than the second frequency. However, if the current decreased after closing switch 234, then $V_{OUT(2)}$ may decrease. Thus, $V_{VCO(2')}$ decreases, and the third frequency of the pulse modulated signal may be less than the second frequency. In response to re-adjusting the pulse modulated signal, VCO 230 of pulse modulation device 224 may output the pulse modulated signal defined by the third frequency to power converter 204.

At the beginning of a third time period T3 that is later than the second time period T2, controller 206 may open switch 234. In response to opening switch 234, voltage $V_{OUT(2)}$ may no longer be applied to voltage adjustment circuit 236. Thus, during the third time period T3, adjustment voltage $V_{ADJ}$ may be zero and voltage adder 232 may output a lower voltage $V_{VCO(3)}$ that is less than $V_{VCO(2')}$. VCO 230 may receive $V_{VCO(3)}$ and may decrease the pulse modulated signal from the third frequency to a fourth frequency that is lower than the third frequency.

During the third time period T3, power converter 204 outputs a third current based on the fourth frequency. Current sensor 220 receives the third current $I_{IN(3)}$ from power converter 204 and generates a third voltage $V_{IN(3)}$ indicative of the third current. Evaluation circuit 222 may receive the third voltage $V_{IN(3)}$. Sample-and-hold circuit 226 may sample the third voltage $V_{IN(3)}$ and may hold the third voltage $V_{IN(3)}$.

In some examples, integrator 228 may integrate the difference between two voltages by a negative value. For example, integrator 228 may integrate the difference between the two voltages by a negative value when switch 234 is open and $V_{IN(t)}$ and $I_{IN(t)}$ are positively related. For instance, integrator 228 may compare the third voltage $V_{IN(3)}$ that is indicative of the third current $I_{IN(3)}$ to the second voltage $V_{IN(2)}$ that is indicative of the second current $I_{IN(2)}$, and may integrate the difference by a negative integer. In theses examples, if $V_{IN(3)}$ is greater than $V_{IN(2)}$, integrator 228 may decrease $V_{OUT(t)}$ such that $V_{OUT(3)}$ is less than $V_{OUT(2)}$. Similarly, if $V_{IN(3)}$ is less than $V_{IN(2)}$, integrator 228 may increase $V_{OUT(t)}$ such that $V_{OUT(3)}$ is greater than $V_{OUT(2)}$.

Pulse modulation device 224 may receive the third output voltage $V_{OUT(3)}$ during the third time period and may re-adjust the pulse modulated signal based at least in part on the third output voltage $V_{OUT(3)}$. For example, because switch 234 may remain open during the third time period T3, voltage adder 232 may receive only the third output voltage $V_{OUT(3)}$ and may output a new voltage $V_{VCO(3')}$. VCO 230 may receive the voltage $V_{VCO(3')}$ and may re-adjust the pulse modulated signal from a fourth frequency to a fifth frequency. For instance, when $V_{VCO(3')}$ is greater than $V_{VCO(3)}$, VCO 230 may increase the frequency of the pulse modulated signal. However, if $V_{VCO(3')}$ is less than $V_{VCO(3)}$, VCO 230 may decrease the frequency of the pulse modulated signal.

Figure 3:
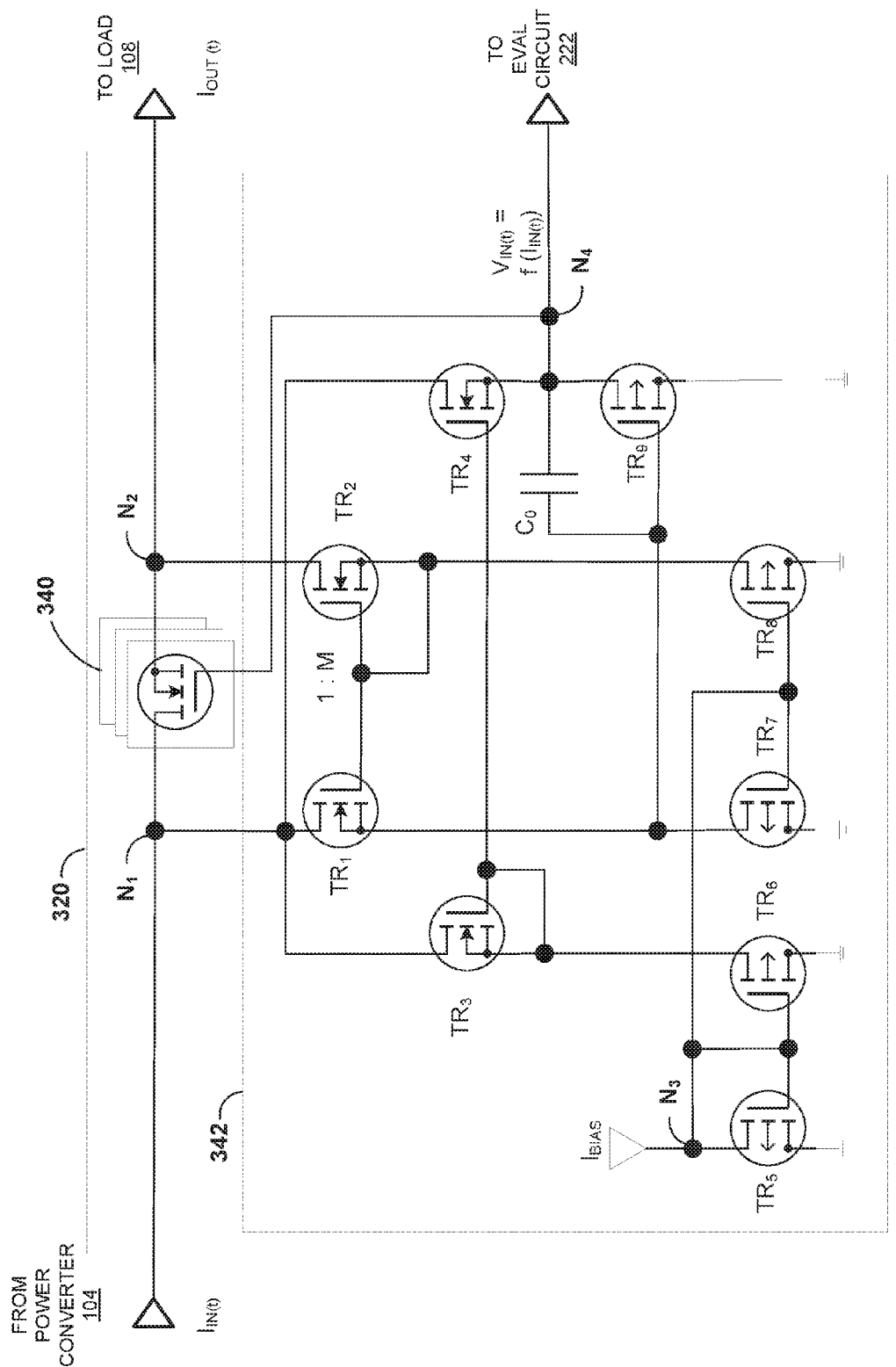
FIG. 3 is a block diagram illustrating an example current sensor, in accordance with one or more aspects of this disclosure.

FIG. 3 is a block diagram illustrating an example current sensor 322, in accordance with one or more aspects of this disclosure. Current sensor 320 may be an example of current sensor 220 of FIG. 2. FIG. 3 illustrates only one particular example of current sensor 320. Many other examples of a current sensor may be used and may include fewer or additional components. As illustrated in FIG. 3, in some examples, current sensor 320 may include at least one high-side transistor 340 and an amplifier circuit 342.

In some examples, the at least one high-side transistor 340 may include a single transistor. In other examples, the at least one high-side transistor 340 may include a plurality (e.g., tens, hundreds, thousands, or more) of transistors in parallel. In some examples, controller 206 of FIG. 2 may determine how many high-side transistors 340 to connect in parallel based on the input current. For instance, if current sensor 320 includes 1,000 high-side transistors 340 and controller 206 detects a low current/power from the power converter, controller 206 may connect a small number (e.g., 10) of high-side transistors 340 in parallel. As the current/power from the power converter increases, controller 206 may connect more of high-side transistors 340 in parallel.

As illustrated in FIG. 3, the at least one high-side transistor 340 includes at least one P-channel MOSFET. However, in other examples, the at least one high-side transistor may include any type or any combination of different types of transistors. For example, the at least one high-side transistor may include bipolar junction transistors (BJTs), metal-oxide field-effect transistors (MOSFETs), junction gate field-effect transistors (JFETs), insulated gate bipolar transistor (IGBTs), or any other types of transistors. Each transistor may include a controlling node (also referred to as a gate or a base, depending on the type of transistor) and two controlled nodes (also referred to as a source and a drain, or a collector and emitter, depending on the type of transistor). Applying a current or a voltage to the controlling node may enable current to flow between the two controlled nodes. For example, each respective controlling node (e.g., the respective gate) of the at least one high-side transistor 340 may be coupled to node $N_4$ of amplifier circuit 342, such that the voltage $V_{IN(t)}$ generated by amplifier circuit 342 may be applied to the controlling node of the at least one high-side transistor 340.

In some examples, the at least one high-side transistor 340 may regulate a voltage or current output to load 108. Each transistor of the at least one high-side transistor 340 may receive the voltage $V_{IN}$ generated by amplifier circuit 342 at the respective controlling node (e.g., the respective gates of the at least one high-side transistors 340). In some examples, current sensor 320 may cause a constant voltage drop across the at least one high-side transistor 340. In some instances, maintaining a constant voltage drop across the at least one high-side transistor 340 while increasing the current $I_{OUT(t)}$ to load 108 may increase the power to load 108.

In some examples, the voltage drop $V_{DS}$ across the at least one high-side transistor 340 may be equal to the difference in the voltage drop across transistors $TR_1$ and $TR_2$. In other words, the voltage drop across the controlled nodes (e.g., $V_{DS}$) of the at least one high-side transistor 340 may be given by the following equation:

$$V_{DS} = V_{GS\_TR1} - V_{GS\_TR2} = kT/q \cdot \ln(M) \qquad \text{Equation 1:}$$

where $kT/q*\ln(M)$ represents the thermal voltage multiplied by the natural log of the transistor ratio of TR2 and TR1 (denoted by M).

Amplifier circuit 342 may include a plurality of transistors $TR_1$-$TR_9$, at least one capacitor $C_0$, and a bias current $I_{BIAS}$. In some examples, transistor $TR_2$ may represent M transistors, where M represents any positive integer. For example, the ratio of transistors $TR_1$ to $TR_2$ may be shown by the ratio 1:M. In some examples, transistors $TR_1$-$TR_9$ may include any type or combination of types of transistors described above. As illustrated in FIG. 3, transistors $TR_1$-$TR_4$ may include P-channel MOSFETs and transistors $TR_5$-$TR_9$ may include N-channel MOSFETs.

In some examples, to keep the voltage drop $V_{DS}$ constant across high-side transistors 340, a voltage $V_{IN}$ is generated by amplifier circuit 342. In some examples, the voltage $V_{IN(t)}$ generated by amplifier circuit 342 is a function of the received input current $I_{IN(t)}$, such that voltage $V_{IN(t)}$ may be indicative of the received input current $I_{IN(t)}$. For instance, amplifier circuit 342 may receive the input current $I_{IN(t)}$ from power converter 104 and may generate voltage $V_{IN(t)}$ based on the input current $I_{IN(t)}$. As illustrated in FIG. 3, in some instances, amplifier circuit 342 may generate a voltage $V_{IN(t)}$ that is inversely, or negatively, related to the input current $I_{IN(t)}$. In these instances, as the input current $I_{IN(t)}$ increases, the voltage $V_{IN}$ (at node $N_4$ may decrease. In some examples, node $N_4$ of amplifier circuit 342 may be coupled to the respective controlling node (e.g., the gate) of each of the at least one high-side transistors 340 and to evaluation circuit 322. Thus, as the current $I_{IN(t)}$ increases, the voltage $V_{IN(t)}$ applied to the at least one high-side transistor 340 and applied to evaluation circuit 322 decreases. While FIG. 3 illustrates an amplifier circuit 342 where voltage $V_{IN(t)}$ is inversely related to the input current $I_{IN(t)}$, in some examples, voltage $V_{IN(t)}$ may be positively related to the input current $I_{IN(t)}$.

Figure 4:
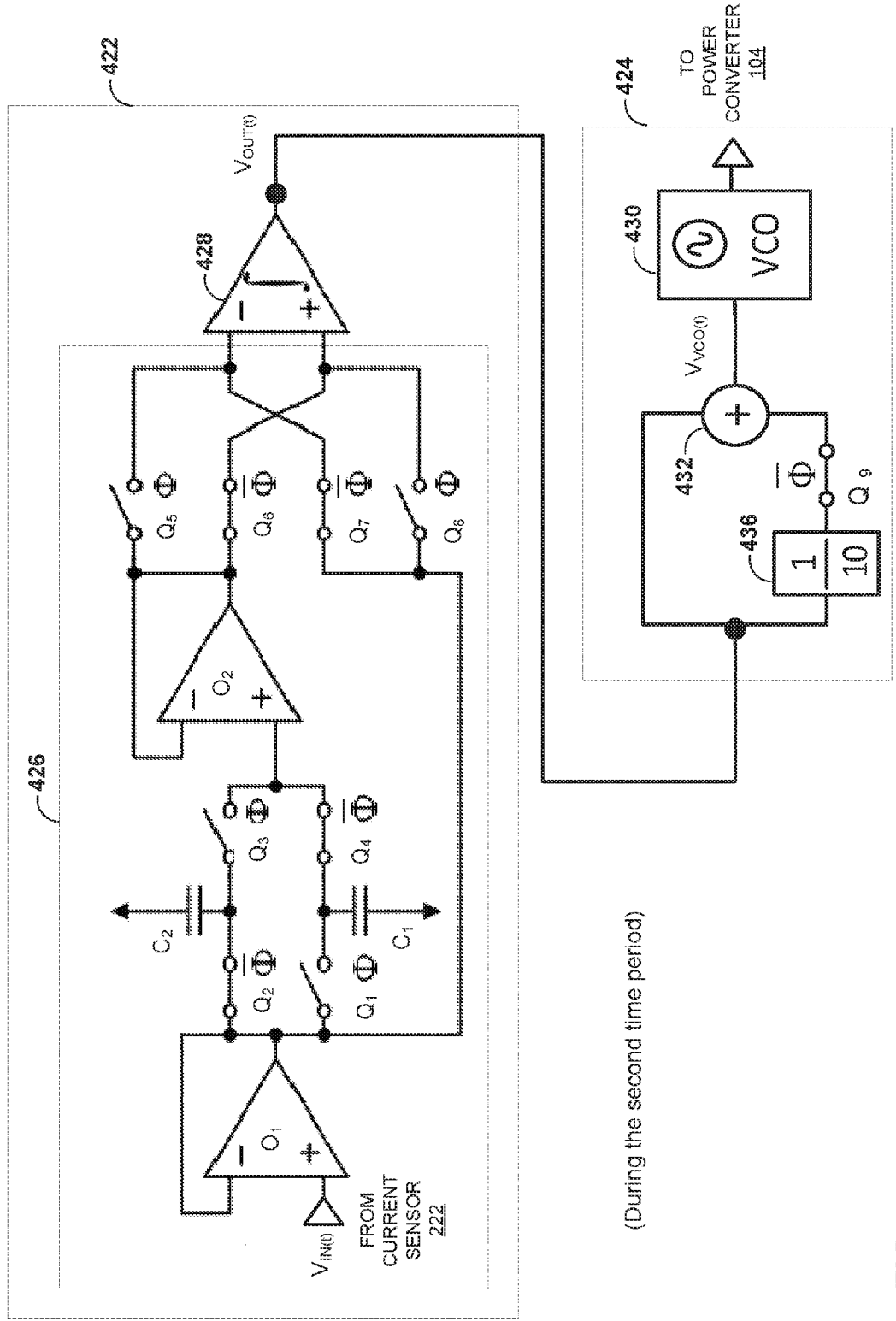
FIG. 4 is a circuit diagram illustrating an example evaluation circuit and pulse modulation device, in accordance with one or more aspects of this disclosure.

FIG. 4 is a circuit diagram illustrating an example evaluation circuit 422 and pulse modulation device 424, in accordance with one or more aspects of this disclosure. FIG. 4 illustrates only one particular example of evaluation circuit 422 and pulse modulation device 424. Many other examples of an evaluation circuit and pulse modulation device may be used and may include fewer or additional components.

As illustrated in FIG. 4, evaluation circuit 424 includes sample-and-hold circuit 426 and integrator 428. Sample-and-hold circuit 426 of evaluation circuit 424 may include operational amplifiers O1 and O2, capacitors C1 and C2, and a plurality of switches Q1-Q8. In some examples, switches Q1-Q8 may include transistors, such as any of the types of transistors described with reference to FIG. 3. A first subset of switches Q1-Q8 (e.g., switches Q1, Q3, Q5, and Q8) may be controlled by a clock signal Φ and a second subset of switches Q1-Q8 (e.g., switches Q2, Q4, Q6, and Q7) may be controlled by the inverted clock signal $\overline{\Phi}$. Clock signal Φ and inverted clock signal $\overline{\Phi}$ may alternate between a logical high signal and a logical low signal. For instance, when clock signal Φ includes a logical high signal, inverted clock signal $\overline{\Phi}$ includes a logical low signal, and vice versa.

In some examples, sample-and-hold circuit 426 may receive a voltage $V_{IN(t)}$ from current sensor 222 of FIG. 2, where the voltage $V_{IN(t)}$ is indicative of the amount of current $I_{IN(t)}$ output by power converter 104. When clock signal Φ is a first logical signal of the logical high or logical low signals, switches Q1, Q3, Q5, and Q8 may be open such that no current may flow through the switches. Similarly, when clock signal Q4 includes the first logical signal (e.g., logical low), inverted clock signal $\overline{\Phi}$ includes the other logical signal of the logical high or logical low signals (e.g., logical high) such that switches Q2, Q4, Q6, and Q7 are closed and current flows through the switches Q2, Q4, Q6, and Q7. As illustrated in FIG. 4, when switch Q2 is closed and switch Q3 is open, current may flow from operational amplifier O1 to capacitor C2, such that capacitor C2 may hold the voltage $V_{IN(t)}$. At the same time, the input voltage $V_{IN(t)}$ received from current sensor 428 may also be applied to integrator 428. Capacitor C1 may store a voltage previously received from current sensor 220. Thus, when switch Q1 is open and switch Q4 is closed, the voltage stored by capacitor C1 may be applied to integrator 428 via operational amplifier O2.

During a first time period T1, switch Q1 may be closed and switch Q4 may be open such that current may flow from op-amp O1 to capacitor C1. During the first time period T1, switch Q2 may be open and switch Q3 may be closed such that current may not flow from op-amp O1 to capacitor C2, but current may flow from capacitor C2 to op-amp 2. Thus, during the first time period T1, sample-and-hold circuit 426 may sample a first input voltage $V_{IN(1)}$ from current sensor 220 and may hold the first input voltage $V_{IN(1)}$ at capacitor C1. During the first time period T1, integrator 428 may output a first output voltage $V_{OUT(1)}$ that is based at least in part on the first input voltage $V_{IN(1)}$.

In some examples, as illustrated in FIG. 4, pulse modulation device 424 may include a voltage adjustment circuit 436, voltage adder 432, and VCO 430, which may correspond to voltage adjustment circuit 236, voltage adder 232, and VCO 230 of FIG. 2, respectively. As illustrated in FIG. 4, in some instances, voltage adjustment circuit 436 may output a voltage $V_{ADJ}$ that is a predetermined fraction (e.g., $1/10^{th}$) of a voltage $V_{OUT(t)}$ received from integrator 428.

During the first time period T1, switch Q9 may be open, such that voltage adjustment circuit 436 may not receive the voltage $V_{OUT(1)}$ from integrator 428. Thus, voltage adder 432 may receive the first output voltage $V_{OUT(1)}$ from integrator 428 and may output voltage $V_{VCO(1)}$. VCO 230 may receive $V_{VCO(1)}$ and may output, based on the $V_{VCO(1)}$, a pulse modulated signal defined by a first frequency.

At the beginning of a second time period T2 that is later than first time period T1, the controller may adjust the frequency of the pulse modulated signal by closing switch Q9. When switch Q9 closes, voltage adjustment circuit 436 may receive the first output voltage $V_{OUT(1)}$ from integrator 428 and may output an adjustment voltage $V_{ADJ}$. Voltage adder 432 may sum $V_{OUT(1)}$ and $V_{ADJ}$, and may output $V_{VCO(2)}$. In other words, at the beginning of the second time period, switch Q9 may close such that $V_{VCO(2)}$ may be greater than $V_{VCO(1)}$. VCO 230 may receive $V_{VCO(2)}$ and as a result, may adjust the frequency of the pulse modulated signal from the first frequency to a second frequency by increasing the frequency.

During the second time period, the power converter may output a second amount of current based on the pulse modulated signal defined by the second frequency. A current sensor (e.g., current sensor 222 of FIG. 2) may receive the second amount of current and may generate a voltage $V_{IN(2)}$ indicative of the second amount of current. Switches Q1, Q3, Q5, and Q8 may receive clock signal Φ which may cause switches Q1, Q3, Q5, and Q8 to open. Similarly, switches Q2, Q4, Q6, and Q7 may receive the inverted clock signal $\overline{\Phi}$ which may cause switches Q2, Q4, Q6, and Q7 to open. During the second time period, because switch Q1 may be open and switches Q4 and Q6 may be closed, the first held voltage $V_{IN(1)}$ held by capacitor C1 may be applied to the non-inverting input of integrator 428. During the second time period T2, switch Q2 may be closed and switch Q3 may be open such that capacitor C2 may hold the second input voltage $V_{IN(2)}$. Similarly, the second voltage $V_{IN(2)}$ may be applied to the inverting input of integrator 428.

During the second time period T2, integrator 428 may receive a first input voltage $V_{IN(1)}$, which was held by capacitor C1, at the non-inverting input (e.g., because switch Q6 is closed and switch Q5 is open). During the same time period T2, integrator 428 may receive the second input voltage $V_{IN(2)}$ at the inverting input (e.g., because switch Q7 is closed and switch Q8 is open). Integrator 428 may adjust $V_{OUT(t)}$ from the first output voltage $V_{OUT(1)}$ to a second output voltage $V_{OUT(2)}$ based on the second input voltage $V_{IN(2)}$ received during the second time period T2 and the first input voltage $V_{IN(1)}$ received during the first time period T1.

Integrator 228 may operate in two different modes. For instances, integrator 228 may integrate the difference between $V_{IN(t)}$ and $V_{IN(t+1)}$ with a positive sign in a one mode and may integrate the difference between $V_{IN(t)}$ and $V_{IN(t+1)}$ with a negative sign in the other mode. For example, in one mode of operation, when switches Q6 and Q7 are closed and switches Q5 and Q8 are open, $V_{IN(t)}$ (e.g., $V_{IN(1)}$) is applied to the non-inverting terminal of integrator 228 and $V_{IN(t+1)}$ (e.g., $V_{IN(2)}$) is applied to the inverting terminal of integrator 228, such that integrator 228 integrates the difference between $V_{IN(t)}$ and $V_{IN(t+1)}$ with a positive sign. Thus, if $V_{IN(2)}$ is less than $V_{IN(1)}$, integrator 428 increases the output voltage such that $V_{OUT(2)}$, is greater than $V_{OUT(1)}$. However, if $V_{IN(2)}$ is greater than $V_{IN(1)}$, integrator 428 decreases the output voltage such that $V_{OUT(2)}$ is less than $V_{OUT(1)}$.

In the other mode of operation, when switches Q6 and Q7 are open and switches Q5 and Q8 are closed, $V_{IN(t)}$ (e.g., $V_{IN(2)}$) is applied to the inverting terminal of integrator 228 and $V_{IN(t+1)}$ (e.g., $V_{IN(3)}$) is applied to the non-inverting terminal of integrator 228, such that integrator 228 integrates the difference between $V_{IN(t)}$ and $V_{IN(t+1)}$ with a negative sign. During the second time period (e.g., while switch 234 is still closed), VCO 230 may re-adjust the pulse modulated signal from a second frequency to a third frequency. For example, when $V_{OUT(2)}$ is greater than $V_{OUT(1)}$, adder 232 increases $V_{VCO(t)}$ from $V_{VCO(2)}$ to $V_{VCO(2')}$ and VCO 230 increases the frequency of the pulse modulated signal to a third frequency that is higher than the second frequency. However, when $V_{OUT(2)}$ is less than $V_{OUT(1)}$, adder 232 decreases $V_{VCO(t)}$ from $V_{VCO(2)}$ to $V_{VCO(2')}$ and VCO 230 decreases the frequency of the pulse modulated signal to a third frequency that is less than the second frequency.

At the beginning of a third time period T3 that is later than second time period T2, switch Q9 may open. When switch Q9 open, voltage adjustment circuit 436 may not receive the second output voltage $V_{OUT(2)}$ from integrator 428. Thus, voltage adder 432 may only receive $V_{OUT(2)}$, which may decrease the voltage received by VCO 230. In other words, at the beginning of the third time period, switch Q9 may open such that $V_{VCO(3)}$, may be less than $V_{VCO(2)}$. As a result, VCO 230 may adjust the frequency of the pulse modulated signal from the third frequency to a fourth frequency by decreasing the frequency.

During the third time period T3, the power converter may output a third amount of current based on the pulse modulated signal defined by the fourth frequency. A current sensor (e.g., current sensor 222 of FIG. 2) may receive the third amount of current and may generate a voltage $V_{IN(3)}$ indicative of the third amount of current. Switches Q1, Q3, Q5, and Q8 may close and switches Q2, Q4, Q6, and Q7 may open. During the third time period, because switch Q1 may be closed and switches Q4 and Q6 may be open, such that capacitor C1 may hold the third voltage $V_{IN(3)}$. During the third time period T3, switch Q2 may open and switches Q3 and Q5 may closed such that the second held voltage $V_{IN(2)}$ may be applied to the inverting input of integrator 428. When Q7 is open and switch Q8 is closed, the third voltage $V_{IN(3)}$ may be applied to the non-inverting input of integrator 428.

During the third time period T3, integrator 428 may receive a second input voltage $V_{IN(2)}$, which was held by capacitor C2, at the inverting input (e.g., because switch Q6 is open and switch Q5 is closed). During the same time period T3, integrator 428 may receive the third input voltage $V_{IN(3)}$ at the non-inverting input (e.g., because switch Q7 is open and switch Q8 is closed). Integrator 428 may adjust $V_{OUT(t)}$ from the second output voltage $V_{OUT(2)}$ to a third output voltage $V_{OUT(3)}$ based on the second input voltage $V_{IN(2)}$ received during the second time period T2 and the third input voltage $V_{IN(3)}$ received during the third time period T3.

In some examples, integrator 428 operates in a mode that integrates the difference between $V_{IN(t)}$ and $V_{IN(t+1)}$ with a negative sign. For example, during the third time period, switches Q6 and Q7 are open and switches Q5 and Q8 are closed, such that $V_{IN(t)}$ (e.g., $V_{IN(2)}$) is applied to the inverting terminal of integrator 228 and $V_{IN(t+1)}$ (e.g., $V_{IN(3)}$) is applied to the non-inverting terminal of integrator 228. In this mode of operation, integrator 228 integrates the difference between $V_{IN(t)}$ and $V_{IN(t+1)}$ with a negative sign. Thus, if $V_{IN(3)}$ is less than $V_{IN(2)}$, integrator 428 decreases the output voltage such that $V_{OUT(3)}$ is less than $V_{OUT(2)}$. However, if $V_{IN(3)}$ is greater than $V_{IN(2)}$, integrator 428 increases the output voltage such that $V_{OUT(3)}$ is greater than $V_{OUT(2)}$.

VCO 230 may readjust the frequency of the pulse modulated signal. For example, when $V_{OUT(3)}$ is greater than $V_{OUT(2)}$, voltage adder 232 increases $V_{VCO(t)}$ from $V_{VCO(3)}$ to $V_{VCO(3')}$, such that VCO 230 increases the frequency of the pulse modulated signal. In other words, the fifth frequency is greater than the fourth frequency. In contrast, when $V_{OUT(3)}$ is less than $V_{OUT(2)}$, voltage adder 232 decreases $V_{VCO(t)}$ from $V_{VCO(3)}$ to $V_{VCO(3')}$, such that VCO 230 decreases the frequency of the pulse modulated signal. In other words, the fifth frequency is less than the fourth frequency.

Figure 5:
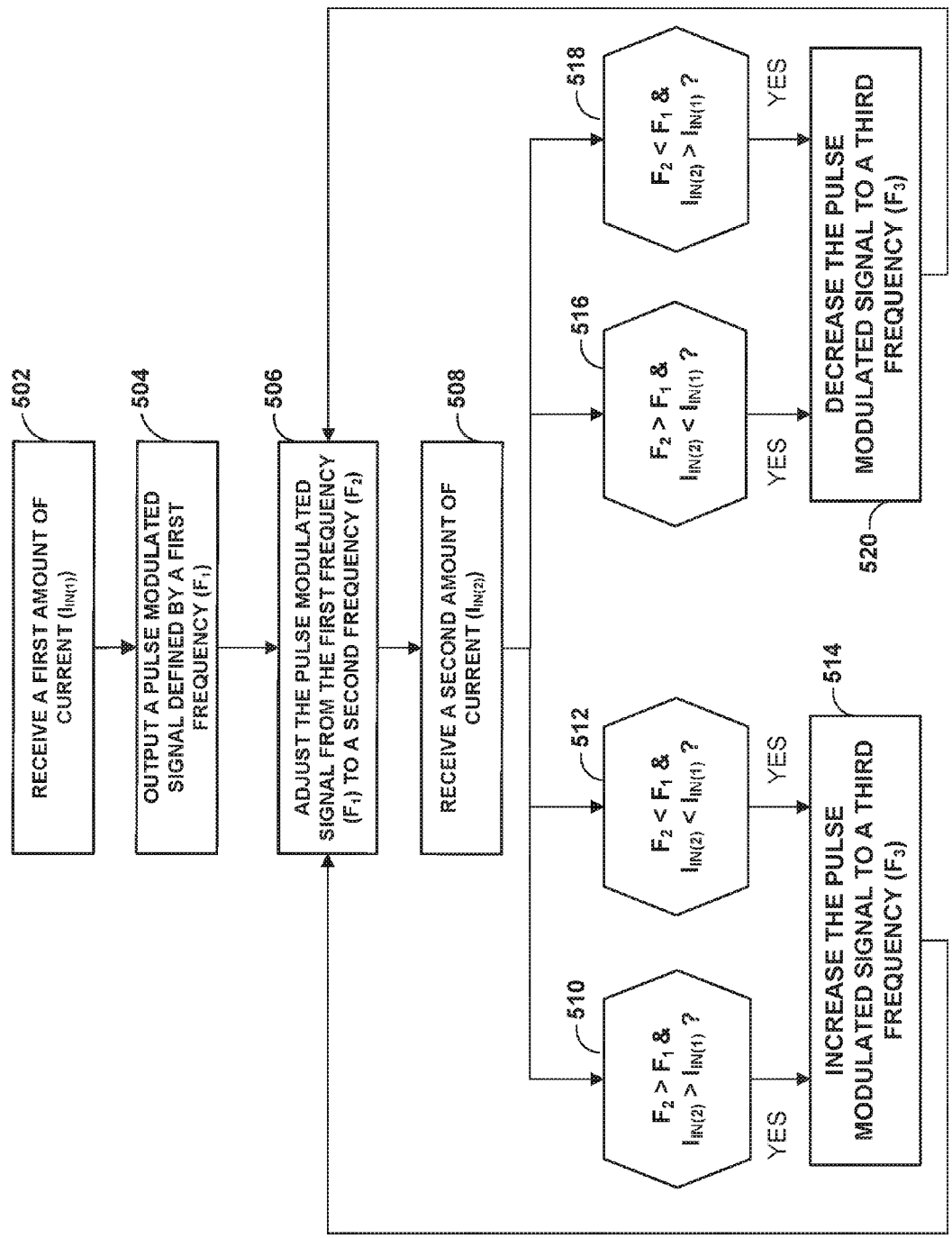
FIG. 5 is a flowchart illustrating an example method for controlling an example power converter, in accordance with one or more aspects of this disclosure.

FIG. 5 is a flowchart illustrating an example method for controlling a power converter, in accordance with one or more aspects of this disclosure. For purposes of illustration only, the example operations are described below within the context of controller 206 of FIG. 2.

Controller 206 may receive a first amount of current $I_{IN(1)}$ from power converter 204 (502). In some examples, a current sensor 220 of controller 206 may receive the first amount of current $I_{IN(1)}$ and may output a first voltage $V_{IN(1)}$ indicative of the first amount of current $I_{IN(1)}$. A sample-and-hold circuit 226 may sample the first voltage $V_{IN(1)}$ and may hold the first voltage $V_{IN(1)}$. In some instances, integrator 228 may output a first output voltage $V_{OUT(1)}$ based at least in part on the first voltage $V_{IN(1)}$.

Controller 206 may output a pulse modulated signal defined by a first frequency to a power converter (504). For example, when switch 234 is open, pulse modulation device 224 may receive the first output voltage $V_{OUT(1)}$. Voltage adder 232 may output a first VCO voltage $V_{VCO(1)}$ based on only the first output voltage $V_{OUT(1)}$. As another example, when switch 234 is closed, voltage adjustment circuit 236 may receive the first output voltage $V_{OUT(1)}$ and may output an adjustment voltage $V_{ADJ}$ based on the first output voltage $V_{OUT(1)}$. Voltage adder 232 may sum adjustment voltage $V_{ADJ}$ and the first output voltage $V_{OUT(1)}$ and may output a first VCO voltage $V_{VCO(1)}$ that represents the sum of the adjustment voltage $V_{ADJ}$ and the first output voltage $V_{OUT(1)}$. VCO 230 may receive the first voltage $V_{VCO(1)}$ output by voltage adder 232 and may output a pulse modulated signal defined by the first frequency ($F_1$) based on the received voltage. Power converter 204 may receive the pulse modulated signal defined by the first frequency and may output a first amount of current based on the pulse modulated signal defined by the first frequency.

Controller 206 may adjust the pulse modulated signal from a first frequency ($F_1$) to a second frequency ($F_2$) (506). For example, if switch 234 was open when pulse modulation device 224 output the first pulse modulated signal, controller 206 may close switch 234. In response to closing switch 234, voltage adjustment circuit 236 may output an adjustment voltage $V_{ADJ}$. After closing switch 234, voltage adder 232 may sum $V_{OUT(1)}$ and $V_{ADJ}$, and may output a voltage $V_{VCO(2)}$ that represents the sum of $V_{OUT(1)}$ and $V_{ADJ}$. VCO 230 may receive the second voltage $V_{VCO(2)}$ from voltage adder 232. In response to receiving the updated output voltage, $V_{VCO(2)}$, VCO 230 may change the frequency of the pulse modulated signal from a first frequency to the second frequency based on the voltage received from voltage adder 232. For instance, because $V_{CO(t)}$ increases in response to closing switch 234 (e.g., $V_{VCO(2)}$ is greater than $V_{VCO(1)}$, VCO 230 may increase the frequency of the pulse modulated signal.

As another example, if switch 234 was closed when pulse modulation device 224 output the first modulated signal, controller 206 may open switch 234. In response to opening switch 234, voltage adjustment circuit 236 may no longer receive and output an adjustment voltage. Thus, after opening switch 234, the voltage received by voltage adder 232 may decrease, such that the second voltage $V_{VCO(2)}$ is less than $V_{VCO(1)}$. VCO 230 may receive the second voltage $V_{VCO(2)}$ from voltage adder 232. In response to receiving the updated output voltage, $V_{VCO(2)}$, VCO 230 may change the frequency of the pulse modulated signal from a first frequency to the second frequency based on the voltage received from voltage adder 232. For instance, because $V_{CO(t)}$ decreases in response to opening switch 234 (e.g., $V_{VCO(2)}$ is less than $V_{VCO(1)}$, VCO 230 may decrease the frequency of the pulse modulated signal. Power converter 204 may receive the pulse modulated signal defined by the second frequency and may output a current based on the pulse modulated signal defined by the second frequency.

In some examples, controller 206 may receive a second amount of current $I_{IN(2)}$ from power converter 204 (508). For example, current sensor 220 may receive the second amount of current $I_{IN(2)}$ and may output a second voltage $V_{IN(2)}$ indicative of the second amount of current $I_{IN(2)}$. Integrator 228 may receive the first voltage $V_{IN(1)}$ from sample-and-hold circuit 226 and may receive the second voltage $V_{IN(2)}$ from current sensor 220 and may output a voltage $V_{OUT(2)}$ that indicates whether the second input voltage $V_{IN(2)}$ is greater than the first input voltage $V_{IN(1)}$.

Controller 206 may re-adjust the frequency of the pulse modulated signal from a second frequency ($F_2$) to a third frequency ($F_3$) that is greater than the second frequency. For instance, if the second frequency is greater than the first frequency (e.g., because switch 234 closed) and if the second input current $I_{IN(2)}$ is greater than the first input current $I_{IN(1)}$ (510), voltage integrator 228 may increase the output voltage from $V_{OUT(1)}$ to $V_{OUT(2)}$. Voltage adder 232 may receive the second output voltage $V_{OUT(2)}$ and may increase the voltage from $V_{VCO(2)}$ to $V_{VCO(2')}$, such that may receive the increased voltage $V_{VCO(2')}$. As a result, VCO 230 may increase the frequency of the pulse modulated signal (514).

In some examples, if the second frequency ($F_2$) is less than the first frequency ($F_1$) (e.g., because switch 234 opened) and if the second input current $I_{IN(2)}$ is less than the first input current $I_{IN(1)}$ (512), voltage integrator 228 may increase the output voltage $V_{OUT(2)}$. Voltage adder 232 may receive the second output voltage $V_{OUT(2)}$ and may increase the voltage from $V_{VCO(2)}$ to $V_{VCO(2')}$. VCO 230 may receive the third voltage $V_{VCO(2')}$ from voltage adder 232. As a result, VCO 230 may increase the pulse modulated signal to a third frequency (514).

Controller 206 may adjust the frequency of the pulse modulated signal from a second frequency ($F_2$) to a third frequency ($F_3$) that is less than the second frequency. For instance, if the second frequency ($F_2$) is greater than the first frequency ($F_1$) (e.g., because switch 234 closed) and if the second input current $I_{IN(2)}$ is less than the first input current $I_{IN(1)}$ (516), voltage integrator 228 may decrease the output voltage $V_{OUT(2)}$. Voltage adder 232 may receive the second output voltage $V_{OUT(2)}$ and may decrease the voltage from $V_{VCO(2)}$ to $V_{VCO(2')}$. VCO 230 may receive the decreased voltage $V_{VCO(2')}$. Thus, VCO 230 may decrease the frequency of the pulse modulated signal (520) to a third frequency ($F_3$) that is less than the second frequency ($F_2$).

In some examples, if the second amount of current is greater than the first amount of current and the second frequency ($F_2$) is less than the first frequency ($F_1$) (e.g., because switch 234 opened), integrator 228 may decrease the output voltage $V_{OUT(2)}$. Voltage adder 232 may receive the second output voltage $V_{OUT(2)}$ and may decrease the voltage from $V_{VCO(2)}$ to $V_{VCO(2')}$. VCO 230 may receive the decreased voltage $V_{VCO(2')}$. As a result, VCO 230 may decrease the frequency of the pulse modulated signal (520) to a third frequency ($F_3$) that is less than the second frequency ($F_2$).

The following numbered examples may illustrate one or more aspects of the disclosure:

Example 1

A controller for controlling a power converter, the controller comprising a pulse modulation device and a current sensor, wherein the controller is configured to: receive, by the current sensor, a first amount of current from the power converter; in response to receiving the first amount of current, output, by the pulse modulation device and to the power converter, a pulse modulated signal defined by a first frequency; after outputting the pulse modulated signal defined by the first frequency, adjust, by the pulse modulation device, the pulse modulated signal from the first frequency to a second frequency; in response to adjusting the pulse modulated signal, receive, by the current sensor, a second amount of current from the power converter; re-adjust, by the pulse modulation device, based at least in part on a change from the first frequency to the second frequency, the first amount of current, and the second amount of current, the pulse modulated signal from the second frequency to a third frequency; and output, by the pulse modulation device and to the power converter, the pulse modulated signal defined by the third frequency.

Example 2

The controller of example 1, wherein the controller is configured to re-adjust the pulse modulated signal by increasing the frequency if: the second frequency is greater than the first frequency and the second amount of current is greater than the first amount of current, or the second frequency is less than the first frequency and the second amount of current is less than the first amount of current

Example 3

The controller of any of examples 1-2, wherein the pulse modulation device is configured to re-adjust the pulse modulated signal by decreasing the frequency if: the second frequency is greater than the first frequency and the second amount of current is less than the first amount of current, or the second frequency is less than the first frequency and the second amount of current is greater than the first amount of current.

Example 4

The controller of any of examples 1-3, wherein the pulse modulation device is configured to re-adjust the pulse modulated signal by a predetermined amount.

Example 5

The controller of example 1, wherein the controller is further configured to: receive, by an integrator of the controller, from the current sensor, a first value indicative of the first amount of current; receive, by the integrator and from the current sensor, a second value indicate of the second amount of current; and generate, by the integrator, a voltage by integrating a difference between the first value indicative of the first amount of current and the second value indicative of the second amount of current, wherein the integrator is configured to integrate the difference between the first value and the second value by a positive value when the integrator operates in a first mode; wherein the integrator is configured to integrate the difference between the first value and the second value by a negative value when the integrator operates in a second mode, and wherein the pulse modulation device is further configured to re-adjust the pulse modulated signal from the second frequency to the third frequency based on the voltage generated by the integrator.

Example 6

The controller of any of examples 1-5, further comprising an evaluation circuit, wherein the current sensor is further configured to generate, based on the first amount of current, a first voltage indicative of the first amount of current; generate, based on the second amount of current, a second voltage indicative of the second amount of current; wherein the evaluation circuit is configured to: generate, based on the first voltage and the second voltage, a third voltage; and wherein the pulse modulation device configured to re-adjust the pulse modulated signal from the second frequency to the third frequency by being configured to: receive, from the evaluation circuit, the third voltage; and re-adjust, based on the third voltage, the pulse modulated signal from the second frequency to the third frequency.

Example 7

The controller of example 6, wherein the current sensor comprises: at least one transistor electrically disposed between the power converter and a load; and an amplifier circuit configured to: in response to generating the first voltage, output, to a controlling node of the at least one transistor and to the evaluation circuit, the first voltage; in response to generating the second voltage, output, to the controlling node of the at least one transistor and to the evaluation circuit, the second voltage; wherein outputting the first voltage and the second voltage to the controlling node of the at least one transistor causes the at least one transistor to turn-on such that current flows from the power converter to the load.

Example 8

The controller of any of examples 1-7, wherein the controller is configured to re-adjust the pulse modulated signal without disconnecting the power converter from a power source.

Example 9

A method for controlling a power converter, the method comprising: receiving, by a current sensor of a controller, a first amount of current from the power converter; in response to receiving the first amount of current, outputting, by a pulse modulation device of the controller, a pulse modulated signal defined by a first frequency; after outputting the pulse modulated signal defined by the first frequency, adjusting, by the pulse modulation device, the pulse modulated signal from the first frequency to a second frequency; in response to adjusting the pulse modulated signal, receiving, by the current sensor, a second amount of current from the power converter; re-adjusting, by the pulse modulation device and based at least in part on a change from the first frequency to the second frequency, the first amount of current, and the second amount of current, the pulse modulated signal from the second frequency to a third frequency; and outputting, by the pulse modulation device and to the power converter, the pulse modulated signal defined by the third frequency.

Example 10

The method of example 9, wherein re-adjusting the pulse modulated signal includes increasing, by the pulse modulation device, the frequency if: the second frequency is greater than the first frequency and the second amount of current is greater than the first amount of current, or the second frequency is less than the first frequency and the second amount of current is less than the first amount of current.

Example 11

The method of any combination of examples 9-10, wherein re-adjusting the pulse modulated signal includes decreasing, by the pulse modulation device, the frequency if: the second frequency is greater than the first frequency and the second amount of current is less than the first amount of current, or the second frequency is less than the first frequency and the second amount of current is greater than the first amount of current.

Example 12

The method of any combination of examples 9-11, wherein adjusting the pulse modulated signal comprises re-adjusting, by the pulse modulation device, the pulse modulated signal by a predetermined amount.

Example 13

The method of any combination of examples 9-12, further comprising: receiving, by an integrator of the controller, from the current sensor, a first value indicative of the first amount of current; receiving, by the integrator and from the current sensor, a second value indicate of the second amount of current; and generating, by the integrator, a voltage by integrating a difference between the first value indicative of the first amount of current and the second value indicative of the second amount of current, wherein integrating comprises integrating the difference between the first value and the second value by a positive value when the integrator operates in a first mode; and wherein integrating comprises integrating the difference between the first value and the second value by a negative value when the integrator operates in a second mode, wherein re-adjusting the pulse modulated signal is further based on the voltage generated by the integrator.

Example 14

The method of any combination of examples 9-13, further comprising: generating, by the current sensor and based on the first amount of current, a first voltage indicative of the first amount of current; generating, by the current sensor and based on the second amount of current, a second voltage indicative of the second amount of current; and generating, by an evaluation circuit of the controller and based on the first voltage and the second voltage, a third voltage, wherein re-adjusting the pulse modulated signal from the second frequency to the third frequency comprises: receiving, by the pulse modulation device and from the evaluation circuit, the third voltage; and re-adjusting, by the pulse modulation device and based on the third voltage, the pulse modulated signal from the second frequency to the third frequency.

Example 15

The method of example 14, further comprising: in response to generating the first voltage, outputting, by an amplifier circuit of the current sensor, to a controlling node of at least one transistor electrically disposed between the power converter and a load, and to the evaluation circuit, the first voltage; and in response to generating the second voltage, outputting, by the amplifier circuit, to the controlling node of the at least one transistor and to the evaluation circuit, the second voltage, wherein outputting the first voltage and the second voltage to the controlling node of the at least one transistor causes the at least one transistor to turn-on such that current flows from the power converter to the load.

Example 16

The method of any combination of examples 9-15, wherein the controller is configured to re-adjust the pulse modulated signal without disconnecting the power converter from a power source.

Example 17

A system comprising: a power converter, and a controller comprising a pulse modulation device and a current sensor. The controller is configured to: receive, by the current sensor, a first amount of current from the power converter; in response to receiving the first amount of current, output, by the pulse modulation device and to the power converter, a pulse modulated signal defined by a first frequency; after outputting the pulse modulated signal defined by the first frequency, adjust, by the pulse modulation device, the pulse modulated signal from the first frequency to a second frequency; in response to adjusting the frequency of the pulse modulated signal, receive, by the current sensor, a second amount of current from the power converter; re-adjust, by the pulse modulation device and based at least in part on a change from the first frequency to the second frequency, the first amount of current, and the second amount of current, the pulse modulated signal from the second frequency to a third frequency; and output, by the pulse modulation device and to the power converter, the pulse modulated signal defined by the third frequency.

Example 18

The system of example 17, wherein the pulse modulation device is configured to re-adjust the pulse modulated signal by increasing the frequency if: the second frequency is greater than the first frequency and the second amount of current is greater than the first amount of current, or the second frequency is less than the first frequency and the second amount of current is less than the first amount of current.

Example 19

The system of any combination of examples 16-17, wherein the pulse modulation device is configured to re-adjust the pulse modulated signal by decreasing the frequency if: the second frequency is greater than the first frequency and the second amount of current is less than the first amount of current, or the second frequency is less than the first frequency and the second amount of current is greater than the first amount of current.

Example 20

The system of any combination of examples 16-19, wherein the controller is further configured to: receive, by an integrator of the controller, from the current sensor, a first value indicative of the first amount of current; receive, by the integrator and from the current sensor, a second value indicate of the second amount of current; and generate, by the integrator, a voltage by integrating a difference between the first value indicative of the first amount of current and the second value indicative of the second amount of current, wherein the integrator is configured to integrate the difference between the first value and the second value by a positive value when the integrator operates in a first mode; and wherein the integrator is configured to integrate the difference between the first value and the second value by a negative value when the integrator operates in a second mode, and wherein the pulse modulation device is further configured to re-adjust the pulse modulated signal from the second frequency to the third frequency based on the voltage generated by the integrator.

The aforementioned examples are used to show examples or applications that are applicable to the techniques and circuits described herein. In one or more examples, the functions described may be implemented in hardware, software, firmware, or any combination thereof. For example, one or more of the controllers described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A controller for controlling a power converter, the controller configured to:
   receive, by a current sensor of the controller, a first amount of current from the power converter;
   in response to receiving the first amount of current, output, by a pulse modulation device of the controller, to the power converter, a pulse modulated signal defined by a first frequency;
   after outputting the pulse modulated signal defined by the first frequency, adjust, by the pulse modulation device, the pulse modulated signal from the first frequency to a second frequency;
   in response to adjusting the pulse modulated signal, receive, by the current sensor, a second amount of current from the power converter;
   re-adjust, by the pulse modulation device, based at least in part on a change from the first frequency to the second frequency, the first amount of current, and the second amount of current, the pulse modulated signal from the second frequency to a third frequency; and
   output, by the pulse modulation device and to the power converter, the pulse modulated signal defined by the third frequency.

2. The controller of claim 1, wherein the pulse modulation device is configured to re-adjust the pulse modulated signal by increasing the frequency if:
   the second frequency is greater than the first frequency and the second amount of current is greater than the first amount of current, or
   the second frequency is less than the first frequency and the second amount of current is less than the first amount of current.

3. The controller of claim 1, wherein the pulse modulation device is configured to re-adjust the pulse modulated signal by decreasing the frequency if:
   the second frequency is greater than the first frequency and the second amount of current is less than the first amount of current, or
   the second frequency is less than the first frequency and the second amount of current is greater than the first amount of current.

4. The controller of claim 1, wherein the pulse modulation device is configured to adjust the pulse modulated signal by a predetermined amount.

5. The controller of claim 1, wherein the controller is further configured to:
   receive, by an integrator of the controller, from the current sensor, a first value indicative of the first amount of current;
   receive, by the integrator and from the current sensor, a second value indicate of the second amount of current; and
   generate, by the integrator, a voltage by integrating a difference between the first value indicative of the first amount of current and the second value indicative of the second amount of current,
   wherein the integrator is configured to integrate the difference between the first value and the second value by a positive value when the integrator operates in a first mode;
   wherein the integrator is configured to integrate the difference between the first value and the second value by a negative value when the integrator operates in a second mode, and
   wherein the pulse modulation device is further configured to re-adjust the pulse modulated signal from the second frequency to the third frequency based on the voltage generated by the integrator.

6. The controller of claim 1, further comprising an evaluation circuit,
   wherein the current sensor is further configured to:
      generate, based on the first amount of current, a first voltage indicative of the first amount of current;
      generate, based on the second amount of current, a second voltage indicative of the second amount of current,
   wherein the evaluation circuit is configured to:
      generate, based on the first voltage and the second voltage, a third voltage; and wherein the pulse modulation device is configured to re-adjust the pulse modulated signal from the second frequency to the third frequency by being configured to:
  receive, from the evaluation circuit, the third voltage; and
  re-adjust, based on the third voltage, the pulse modulated signal from the second frequency to the third frequency.

7. The controller of claim 6, wherein the current sensor comprises:
  at least one transistor electrically disposed between the power converter and a load; and
  an amplifier circuit configured to:
    in response to generating the first voltage, output, to a controlling node of the at least one transistor and to the evaluation circuit, the first voltage;
    in response to generating the second voltage, output, to the controlling node of the at least one transistor and to the evaluation circuit, the second voltage;
  wherein outputting the first voltage and the second voltage to the controlling node of the at least one transistor causes the at least one transistor to turn-on such that current flows from the power converter to the load.

8. The controller of claim 1, wherein the controller is configured to re-adjust the pulse modulated signal without disconnecting the power converter from a power source.

9. A method for controlling a power converter, the method comprising:
  receiving, by a current sensor of a controller, a first amount of current from the power converter;
  in response to receiving the first amount of current, outputting, by a pulse modulation device of the controller, a pulse modulated signal defined by a first frequency;
  after outputting the pulse modulated signal defined by the first frequency, adjusting, by the pulse modulation device, the pulse modulated signal from the first frequency to a second frequency;
  in response to adjusting the pulse modulated signal, receiving, by the current sensor, a second amount of current from the power converter;
  re-adjusting, by the pulse modulation device and based at least in part on a change from the first frequency to the second frequency, the first amount of current, and the second amount of current, the pulse modulated signal from the second frequency to a third frequency; and
  outputting, by the pulse modulation device and to the power converter, the pulse modulated signal defined by the third frequency.

10. The method of claim 9, wherein re-adjusting the pulse modulated signal includes increasing, by the pulse modulation device, the frequency if:
  the second frequency is greater than the first frequency and the second amount of current is greater than the first amount of current, or
  the second frequency is less than the first frequency and the second amount of current is less than the first amount of current.

11. The method of claim 9, wherein re-adjusting the pulse modulated signal includes decreasing, by the pulse modulation device, the frequency if:
  the second frequency is greater than the first frequency and the second amount of current is less than the first amount of current, or
  the second frequency is less than the first frequency and the second amount of current is greater than the first amount of current.

12. The method of claim 9, wherein re-adjusting the pulse modulated signal comprises re-adjusting, by the pulse modulation device, the pulse modulated signal by a predetermined amount.

13. The method of claim 9, further comprising:
  receiving, by an integrator of the controller, from the current sensor, a first value indicative of the first amount of current;
  receiving, by the integrator and from the current sensor, a second value indicate of the second amount of current; and
  generating, by the integrator, a voltage by integrating a difference between the first value indicative of the first amount of current and the second value indicative of the second amount of current,
  wherein integrating comprises integrating the difference between the first value and the second value by a positive value when the integrator operates in a first mode; and
  wherein integrating comprises integrating the difference between the first value and the second value by a negative value when the integrator operates in a second mode,
  wherein re-adjusting the pulse modulated signal is further based on the voltage generated by the integrator.

14. The method of claim 9, further comprising:
  generating, by the current sensor and based on the first amount of current, a first voltage indicative of the first amount of current;
  generating, by the current sensor and based on the second amount of current, a second voltage indicative of the second amount of current; and
  generating, by an evaluation circuit of the controller and based on the first voltage and the second voltage, a third voltage,
  wherein re-adjusting the pulse modulated signal from the second frequency to the third frequency comprises:
    receiving, by the pulse modulation device and from the evaluation circuit, the third voltage; and
    re-adjusting, by the pulse modulation device and based on the third voltage, the pulse modulated signal from the second frequency to the third frequency.

15. The method of claim 14, further comprising:
  in response to generating the first voltage, outputting, by an amplifier circuit of the current sensor, to a controlling node of at least one transistor electrically disposed between the power converter and a load, and to the evaluation circuit, the first voltage; and
  in response to generating the second voltage, outputting, by the amplifier circuit, to the controlling node of the at least one transistor and to the evaluation circuit, the second voltage,
  wherein outputting the first voltage and the second voltage to the controlling node of the at least one transistor causes the at least one transistor to turn-on such that current flows from the power converter to the load.

16. The method of claim 9, wherein the controller is configured to re-adjust the pulse modulated signal without disconnecting the power converter from a power source.

17. A system comprising:
  a power converter, and
  a controller comprising a pulse modulation device and a current sensor, the controller configured to:

receive, by the current sensor, a first amount of current from the power converter;

in response to receiving the first amount of current, output, by the pulse modulation device and to the power converter, a pulse modulated signal defined by a first frequency;

after outputting the pulse modulated signal defined by the first frequency, adjust, by the pulse modulation device, the pulse modulated signal from the first frequency to a second frequency;

in response to adjusting the frequency of the pulse modulated signal, receive, by the current sensor, a second amount of current from the power converter;

re-adjust, by the pulse modulation device and based at least in part on a change from the first frequency to the second frequency, the first amount of current, and the second amount of current, the pulse modulated signal from the second frequency to a third frequency; and output, by the pulse modulation device and to the power converter, the pulse modulated signal defined by the third frequency.

18. The system of claim 17, wherein the pulse modulation device is configured to re-adjust the pulse modulated signal by increasing the frequency if:

the second frequency is greater than the first frequency and the second amount of current is greater than the first amount of current, or the second frequency is less than the first frequency and the second amount of current is less than the first amount of current.

19. The system of claim 17, wherein the pulse modulation device is configured to re-adjust the pulse modulated signal by decreasing the frequency if:

the second frequency is greater than the first frequency and the second amount of current is less than the first amount of current, or the second frequency is less than the first frequency and the second amount of current is greater than the first amount of current.

20. The system of claim 17, wherein the controller is further configured to:

receive, by an integrator of the controller, from the current sensor, a first value indicative of the first amount of current;

receive, by the integrator and from the current sensor, a second value indicate of the second amount of current; and generate, by the integrator, a voltage by integrating a difference between the first value indicative of the first amount of current and the second value indicative of the second amount of current, wherein the integrator is configured to integrate the difference between the first value and the second value by a positive value when the integrator operates in a first mode; and wherein the integrator is configured to integrate the difference between the first value and the second value by a negative value when the integrator operates in a second mode, and wherein the pulse modulation device is further configured to re-adjust the pulse modulated signal from the second frequency to the third frequency based on the voltage generated by the integrator.

* * * * *